(12) United States Patent
Watari

(10) Patent No.: US 7,205,528 B2
(45) Date of Patent: Apr. 17, 2007

(54) METHOD OF AND APPARATUS FOR DETECTING COORDINATE POSITION HAVING THREE SCANNING MODES

(75) Inventor: Haruo Watari, Tokyo (JP)

(73) Assignee: Pioneer Corporation, Tokyo (JP)

( * ) Notice: Subject to any disclaimer, the term of this patent is extended or adjusted under 35 U.S.C. 154(b) by 214 days.

(21) Appl. No.: 11/091,579

(22) Filed: Mar. 29, 2005

(65) Prior Publication Data

US 2005/0218307 A1    Oct. 6, 2005

(30) Foreign Application Priority Data

Mar. 30, 2004    (JP)    ............................. 2004-100131

(51) Int. Cl.
*H01J 40/14*    (2006.01)
(52) U.S. Cl. .................................. 250/221; 250/559.12
(58) Field of Classification Search ................ 250/221, 250/208.1, 559.12, 559.06
See application file for complete search history.

(56) References Cited

U.S. PATENT DOCUMENTS 5,789,739 A * 8/1998 Schwarz ..................... 250/221

FOREIGN PATENT DOCUMENTS

JP    2001-306241    11/2001

* cited by examiner

*Primary Examiner*—Que T. Le
(74) *Attorney, Agent, or Firm*—Arent Fox LLP

(57) ABSTRACT

It is an object of the present invention to perform a coordinate position detection not involving detection miss, even if a drawing process frequently involves detection interruptions on a display surface. A method of the invention comprises: performing a scanning in a first scanning area corresponding to the width of the display surface at the time of an initial detection of a shading object; performing, when continuing the detection of the shading object, a scanning in a second scanning area whose scanning region is an area near the latest detection position; performing, after an interruption in the detection of the shading object, a scanning in a third scanning area which is broader than the second scanning area but narrower than the first scanning area, within a predetermined time period and with the detection position of a continued detection serving as reference.

10 Claims, 5 Drawing Sheets

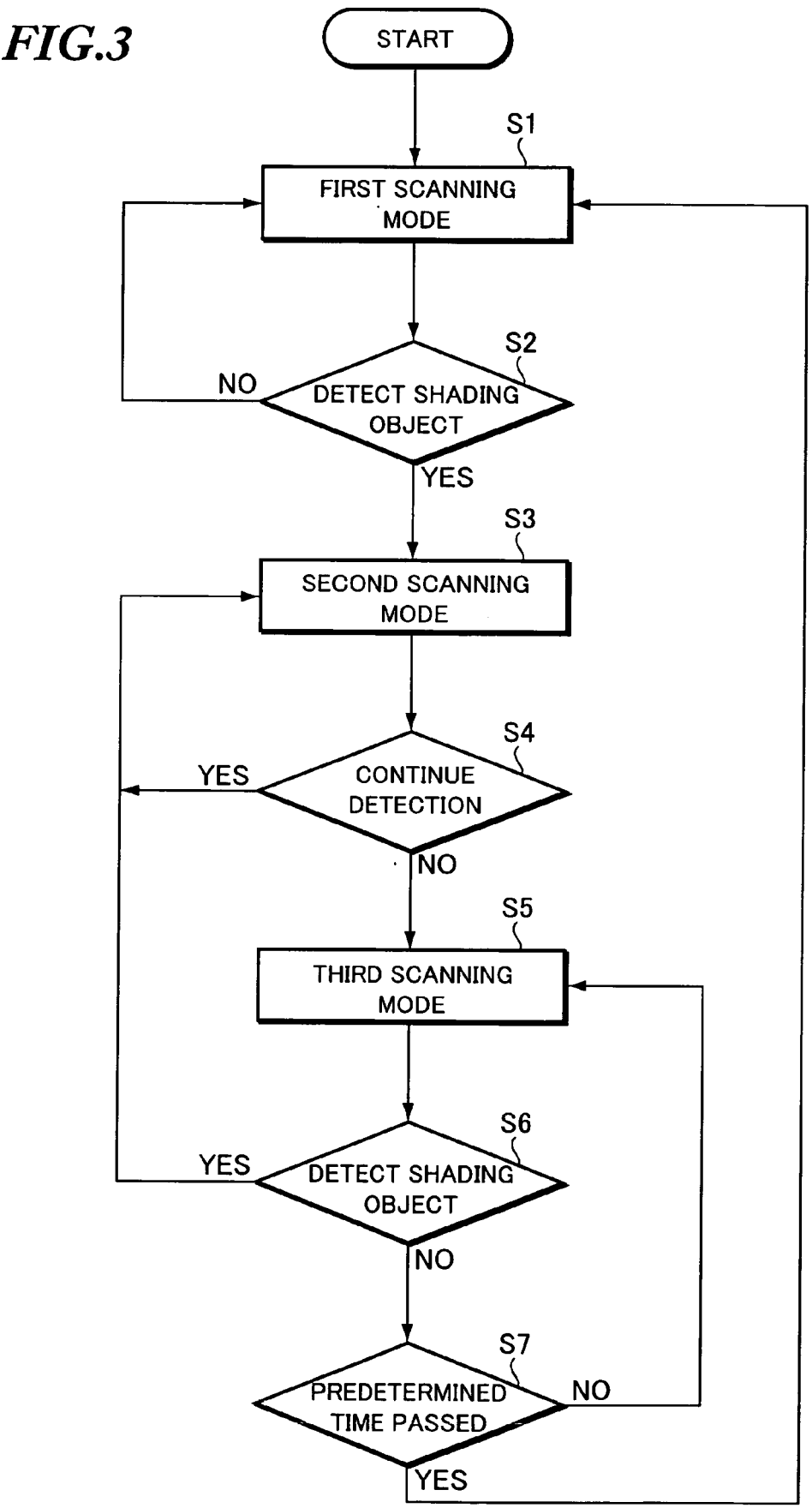

METHOD OF AND APPARATUS FOR DETECTING COORDINATE POSITION HAVING THREE SCANNING MODES

BACKGROUND OF THE INVENTION

The present invention relates to a method of and an apparatus for detecting a coordinate position.

The present application claims priority from Japanese Application No. 2004-100131, the disclosure of which is incorporated herein by reference.

As a prior art for the present invention, Japanese Unexamined Patent Application Publication No. 2001-306241 discloses a coordinate position detecting method adopted in an optical touch panel or the like. This method detects a coordinate position on a display surface by using detection beams to scan in the horizontal direction and the vertical direction (X axis, Y axis) which are orthogonal to each other on a two-dimensional display surface, thereby detecting the position of a shading object touched on the display surface, in accordance with the scanning positions of the detection beams shaded by the shading object.

FIG. 1 is an explanatory view showing the above constitution. As shown, a plurality of light emitting elements $2x$ are arranged in X axis direction along one side of the display surface 1, while a plurality of light receiving elements $3x$ are arranged opposite the light emitting elements $2x$. Further, a plurality of light emitting elements $2y$ are arranged in Y axis direction along another side of the display surface 1, while a plurality of light receiving elements $3y$ are arranged opposite the light emitting elements $2y$. In this manner, each line of the light emitting elements $2x$, $2y$ are lighted so as to emit light beams $Lx$ and $Ly$ successively from one end to the other. The emitted light beams $Lx$ and $Ly$ are then detected by the light receiving elements $3x$, $3y$. Accordingly, the coordinate position of the shading object which is a point P on the display surface 1 can be detected by light receiving elements $3xp$, $3yp$ shaded by this point P.

On the other hand, Japanese Unexamined Patent Application Publication No. 2001-306241 further discloses that when detecting the coordinate position of a continuously moving shading object, a changeover is performed between a full scanning (a first scanning) mode and a short scanning (a second scanning) mode.

In the above-described prior art, the first scanning mode is a mode for scanning an entire area corresponding to the width of the display surface, enabling the light emitting elements arranged corresponding to the width of the display surface to successively emit light beams from one end to the other so as to effect a scanning (refer to FIG. 1). Such a scanning is adopted in detecting an initial position of a shading object.

On the other hand, the second scanning mode is a mode for scanning in a narrower range than the entire area containing a coordinate position detected in the first scanning mode, lighting the light emitting elements in succession and thus effecting a scanning within such a narrow range. Actually, this mode is adopted for continuously detecting a shading object. As long as the detection is being continued, the position of a shading object to be next detected will be in the vicinity of the position of the shading object which has just been detected. For this reason, a scanning area is limited to a local area (refer to FIG. 1) corresponding to a few light emitting elements, so as to shorten a scanning period by taking into account a moving direction and a moving speed which can be found from the history of detection position when the detection is continued. In this way, if a line (for example) is to be drawn, it is possible to perform a continuous position detection at an exact response speed, thereby ensuring a position detection not involving any detection miss.

However, if for example a character is drawn on the display surface by virtue of a shading object, especially when a plurality of characters are drawn thereon, the detection process will be interrupted between one character and another (i.e. the shading object will move away from the display surface). Moreover, even only single one character is drawn, there is still a possibility that the detection process will be interrupted between one stroke and the another. At this time, although the shading object is moved from one stroke to another or from one character to another within an extremely short time, the aforementioned coordinate position detecting method which performs a changeover between the first scanning mode and the second scanning mode will change its current scanning mode over to the first scanning mode at the time the detection of the shading object is interrupted. As a result, it takes a relatively long time in performing a next position detection, hence increasing a possibility that the position detection will be interrupted at the start of drawing a next character.

Actually, the above problem occurs not only in drawing characters, but also in moving the shading object at a higher speed than the follow-up speed of the second scanning mode (when the movement of the shading object is being continuously detected). Namely, if a straight line is drawn at a high speed, the follow-up speed of the second scanning mode will not be quick enough and the shading object will move away from a second scanning area. As a result, at a time of a next detection only a detection based on the first scanning mode can be performed, and a detection miss is likely to occur in character drawing performed right after the shading object has moved away from an area of the second scanning mode.

SUMMARY OF THE INVENTION

The present invention is to solve the aforementioned problem and it is an object of the invention to provide an improved method of and an improved apparatus for detecting a coordinate position, which use detection beams to scan in predetermined scanning areas along the horizontal direction and the vertical direction on a display surface, to detect the position of a shading object on the display surface corresponding to a scanning position of a detection beam shaded by the shading object, so as to perform a coordinate position detection not involving any detection miss even if a character drawing involves a frequent detection miss on the display surface, particularly to avoid a detection miss at the start of drawing when shifting from one character to another or from one stroke to another within one character, and to ensure a position detection not involving any detection miss even when drawing character(s) at a high speed.

In order to achieve the above objects, the method of and the apparatus for detecting a coordinate position according to the present invention are characterized by at least the following aspects.

According to one aspect of the present invention, there is provided a method of detecting a coordinate position which uses respective detection beams to scan in predetermined scanning areas along the horizontal direction and the vertical direction on a display surface, to detect the position of a shading object on the display surface corresponding to the scanning positions of detection beams shaded by the shading object. This method comprises: performing a scanning in a first scanning area corresponding to the width of the display surface at the time of an initial detection of the shading object; performing, when continuing the detection of the shading object, a scanning in a second scanning area whose scanning region is an area near the latest detection position; and performing, after an interruption in the detection of the shading object, a scanning in a third scanning area which is broader than the second scanning area but narrower than the first scanning area, within a predetermined time period and with the detection position of a continued detection serving as a reference.

According to another aspect of the present invention, there is provided an apparatus of detecting a coordinate position, equipped with scanning device enabling respective detection beams to scan in predetermined scanning areas along the horizontal direction and the vertical direction on a display surface, to detect the position of a shading object on the display surface corresponding to the scanning positions of the detection beams shaded by the shading object. In particular, the scanning device has a first scanning mode, a second scanning mode, and a third scanning mode. The first scanning mode performs a scanning in a scanning area corresponding to the width of the display surface at the time of an initial detection of the shading object. The second scanning mode performs, when continuing the detection of the shading object, a scanning in a scanning area whose scanning region is near the latest detection position. The third scanning mode performs, after an interruption in the detection of the shading object, a scanning in a scanning area which is broader than the second scanning area but narrower than the first scanning area, within a predetermined time period and with the detection position of a continued detection serving as a reference.

BRIEF DESCRIPTION OF THE DRAWINGS

These and other objects and advantages of the present invention will become clear from the following description with reference to the accompanying drawings, wherein:

FIG. 3 is a flowchart showing an operation of a scanning section contained in the coordinate position detecting apparatus formed according to an embodiment of the present invention;

DETAILED DESCRIPTION OF THE PREFERRED EMBODIMENTS

Figure 2:
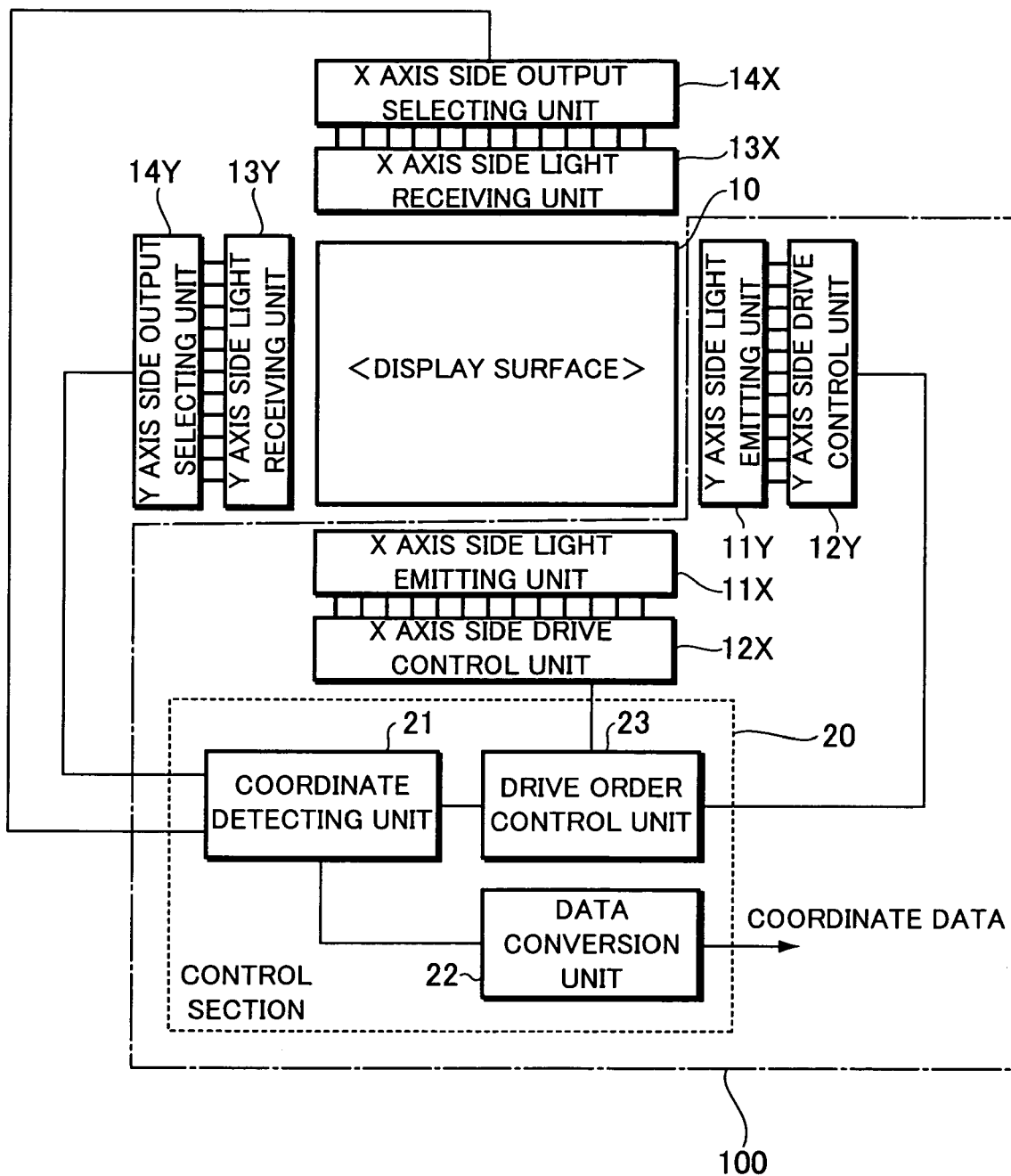
FIG. 2 is an explanatory view showing the constitution of an apparatus for carrying out a coordinate position detecting method according to an embodiment of the present invention.

An embodiment of the present invention will be described below with reference to the accompanying drawings. FIG. 2 is an explanatory view showing the constitution of an apparatus for carrying out the coordinate position detection method according to the present invention. As shown, the apparatus of the invention comprises a scanning section (scanning device) 100 allowing detection beams to scan in predetermined scanning areas along the horizontal direction (X axis direction) and the vertical direction (Y axis direction) on the display surface 10, thereby forming a coordinate position detecting apparatus for detecting the position of a shading object on the display surface 10 corresponding to the scanning positions of detection beams.

The scanning section 100 comprises an X-axis side light emitting unit 11X formed by Xn pieces of light emitting elements in the X axis direction of the display surface 10 corresponding to the horizontal length of the display surface 10, a Y-axis side light emitting unit 11Y formed by Yn pieces of light emitting elements in the Y axis direction of the display surface 10 corresponding to the vertical width of the display surface 10, an X-axis side drive control unit 12X for lighting the X-axis side light emitting unit 11X, a Y-axis side drive control unit 12Y for lighting the Y-axis side light emitting unit 11Y, and a control section 20 for sending out control signals to the X-axis side drive control unit 12X and to the Y-axis side drive control unit 12Y.

In detail, the coordinate position detecting apparatus is formed as follows. Namely, an X-axis side light receiving unit 13X formed by Xn pieces of light receiving elements near one side of the display surface 10 is provided opposite the X-axis side light emitting unit 11X near the other side of the display surface 10, while a Y-axis side light receiving unit 13Y formed by Yn pieces of light receiving elements near one side of the display surface 10 is provided opposite the Y-axis side light emitting unit 11Y near the other side of the display surface 10. In addition, the coordinate position detecting apparatus further comprises an X-axis side output selecting unit 14X and a Y-axis side output selecting unit 14Y for selectively transmitting signals outputted from the X-axis side light receiving unit 13X and the Y-axis side light receiving unit 13Y to the control section 20.

Here, the control section 20 comprises a coordinate detecting unit 21 which detects a coordinate position based on the signals outputted from the X-axis side output selecting unit 14X and the Y-axis side output selecting unit 14Y, a data conversion unit 22 which converts a detected coordinate position into coordinate data, and a drive order control unit 23 which sets a lighting order for each of the X-axis side light emitting unit 11X and the Y-axis side light emitting unit 11Y and performs a mode changeover in a scanning area which will be described later.

Figure 1:
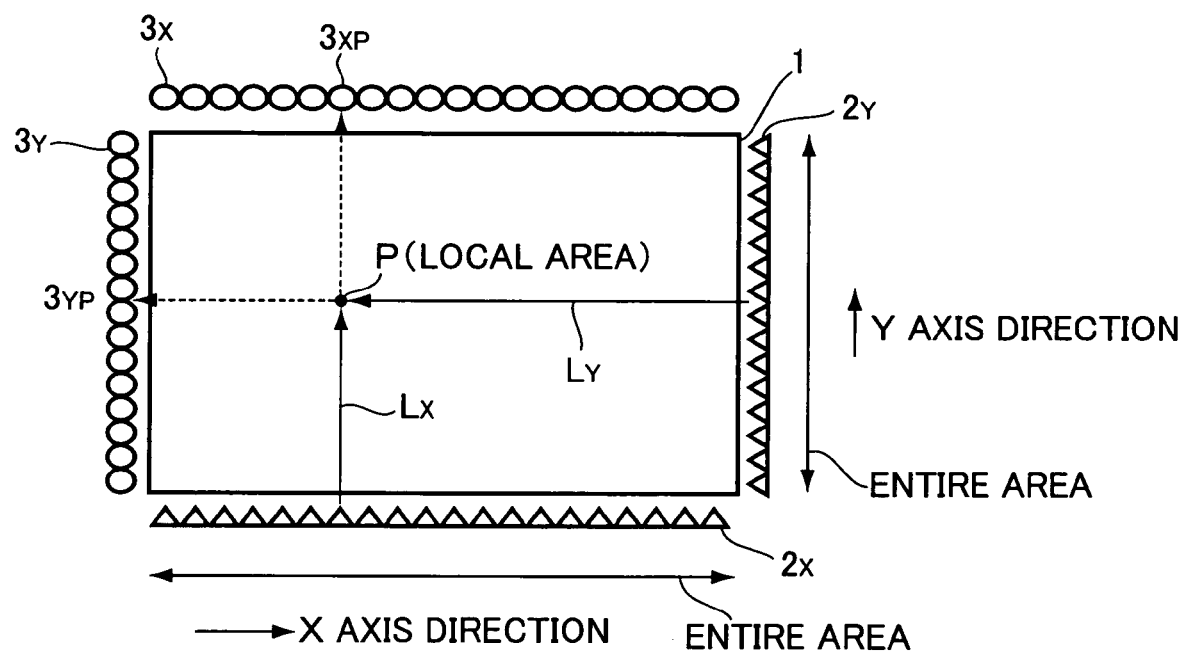
FIG. 1 is an explanatory view showing a prior art.

A basic operation of the coordinate position detecting apparatus described above is the same as the prior art shown in FIG. 1. Namely, the detection beams $L_X$ and $L_Y$ emitted from the respective light emitting elements of the X-axis side light emitting unit 11X and the Y-axis side light emitting unit 11Y to the X-axis side light receiving unit 13X and the Y-axis side light receiving unit 13Y are caused to scan across the predetermined scanning areas, thereby detecting the coordinate position of a shading object which is point P on the display surface 10, by observing the positions of the shaded light receiving elements.

In more detail, the coordinate position detecting apparatus according to the present embodiment of the present invention is so formed that its scanning section 100 operates in accordance with a first scanning mode, a second scanning mode and a third scanning mode.

The first scanning mode is the same as that of the above-described prior art, acting as a mode for scanning across an entire area (a first scanning area) corresponding to the whole width of the display surface 10, thereby successively lighting the light emitting elements of the X-axis side light emitting unit 11X and the Y-axis side light emitting unit 11Y from one end to the other in each unit. In fact, such scanning mode is adopted at the time of an initial detection of a shading object.

The second scanning mode is also the same as that of the above-described prior art and has a scanning area narrower than the aforementioned entire area which contains the coordinate position detected in the first scanning mode, thereby successively lighting the light emitting elements of the X-axis side light emitting unit 11X and the Y-axis side light emitting unit 11Y within this area and thus effecting the desired scanning. This scanning mode is a mode adopted when a shading object is being continuously detected, and its scanning area is limited to a local area (a second scanning area) involving a plurality of light receiving elements, taking into account the moving direction and the moving speed which can be found from the history of the detection position during the continuation of the detection state. In this way, it is possible to obtain a high response suitable for detecting the movement of a shading object which moves only in a small area due to a shortened scanning period. Moreover, since the detection position is memorized and a next scanning area is determined, it is possible to move the position of the scanning center in accordance with the movement of the shading object.

The third scanning mode serves as the feature of the present embodiment of the present invention and is characterized in that during a predetermined time after the detection of the shading object is interrupted, a scanning is performed in an area (a third scanning area) which is broader than the scanning area (a second scanning area) of the second scanning mode, but narrower than the scanning area (a first scanning area) of the first scanning mode, with the detection position of a continued detection process serving as a reference.

In fact, the third scanning mode is based on the following consideration. Namely, when a continuous detection of a shading object is interrupted, a next position for the shading object to reach is considered to be within a range which is predictable to some extent, so that the scanning area will be narrower than the entire scanning area (the first scanning area) during a predetermined time after the continuous detection is interrupted. In this way, even if the position of the shading object is inputted after the continued detection is interrupted, it is still possible to perform a quick detection of the position of the shading object in the third scanning area which has a shorter scanning period than an entire scanning, thereby avoiding any possible detection miss.

The third scanning mode is particularly effective in drawing characters. Namely, even if the detection is interrupted between one stroke and another or between one character and another, since it is possible to detect the position of the shading object at the start of drawing in the third scanning area having a short scanning period, it is possible to prevent a detection miss at the start of any drawing.

An operation of the scanning section 100 can be described below with reference to an operation flow chart shown in FIG. 3. Namely, at the start of the operation, scanning is performed using the first scanning mode until an initial detection is effected (S1). Then, once a shading object is detected (S2), the operation will proceed to the aforementioned second scanning mode (S3). Subsequently, if the detection of the shading object is continued (S4), such detection is constantly performed in accordance with the second scanning mode, and will proceed to the third scanning mode when the detection is interrupted (S5). Here, although the third scanning mode is performed within only a predetermined time period, if the shading object is detected during such predetermined time period (S6), the operation will again proceed to the second scanning mode (S3), so as to confirm the continuation of the detection state (S4). Then, after the passing of a predetermined time (S7), the operation will again return to the first scanning mode (S1). Thereafter, the above-described steps are repeated.

The scanning area (third scanning area) of the third scanning mode can be described as follows in accordance with an example showing that the third scanning area can be set based on the size of an assumed character to be drawn on the display surface 10.

Figure 4A:
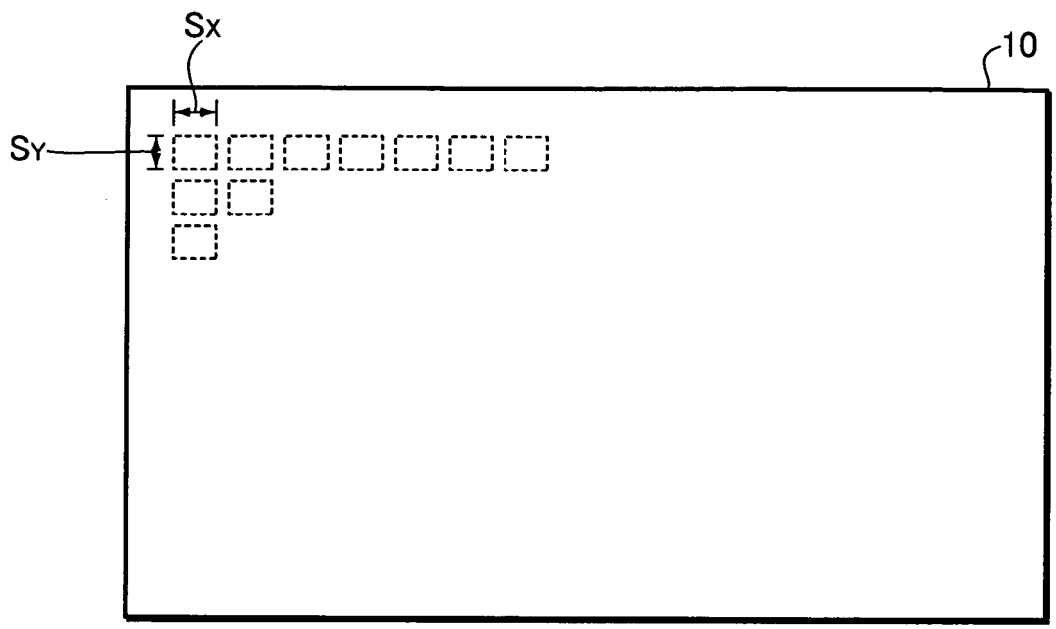
FIGS. 4A and 4B are explanatory views showing a third scanning area according to an embodiment of the present invention.
Figure 4B:
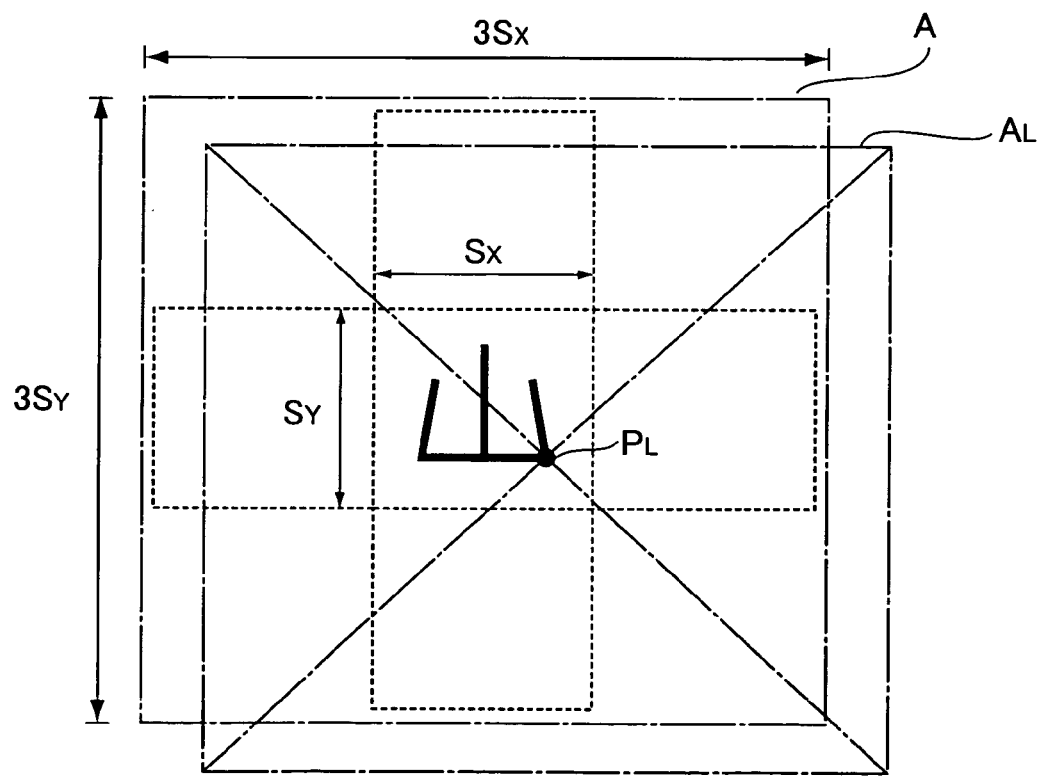

Namely, when a character is drawn on the display surface 10 having a certain size, although the feeling of one person will be different from that of another, it is still possible to obtain an average assumed size $S_X \times S_Y$ according to the size of the display surface 10, as shown in FIG. 4A. Then, when the character is continued to be drawn, the shading object will often shift from an area having an assumed character size to an adjacent area having another assumed character size. In view of this, if the third scanning area A is set at an area larger than $3S_X \times 3S_Y$ with respect to an assumed character size $S_X \times S_Y$ (shown in FIG. 4), it is possible to quickly detect a position at which the drawing of one character can be finished and the drawing of a next character can be started, all in the third scanning area A.

Moreover, the third scanning area can be set not as a fixed area but as a changeable area. As described above, when character drawing is taken as an example, a character drawn on the display surface 10 appears to have different sizes for different persons due to their different personal feelings. Further, since different shading objects move in different manners depending on the contents being drawn on the display surface, if the third scanning area is changed in response to various different uses and individual personal differences, it is possible to further reduce the aforementioned detection miss.

In addition, it is also effective to automatically change the third scanning area in response to an actual use of a user. Namely, a frequency at which an initial detection position (after a detection interruption) moves away from a currently set third scanning area is detected. If the frequency is high, the third scanning area will be changed automatically so as to be enlarged. Alternatively, the detection history of the shading object is made detectable along a time axis. If a condition is such that the detection interruption occurs at a high rate during a short time period, the third scanning area will be made further narrow so as to shorten a scanning period. In this way, if a user desires to draw characters thinly and quickly, the third scanning area can be automatically set narrow. On the other hand, if a user desires to draw characters at a relatively large interval between characters, the third scanning area can be automatically set large.

Moreover, the reference (center) of the third scanning area can be set as follows. Namely, like a scanning area $A_L$ shown in FIG. 4B, it is possible to set the scanning area using a final detection position $P_L$ of a continuous detection as a reference (center). In this way, since the position of the shading object is inputted in areas of equal intervals from a position at which the continuous detection is interrupted, it is possible to effect an averagely acceptable detection regardless of how a character is drawn. Further, the reference (center) of the third scanning area should not be limited as above. Rather, it is also possible to set the reference (center) at a representative position (an average position) calculated from a detection history.

Furthermore, an appropriate time period for executing the third scanning mode can be set on the premise that what is drawn is character. For example, the time period can be set longer than that required for a shift from the end of drawing one character to the start of drawing a next character, but shorter than a time period required for a shift from the end of drawing one character to the start of drawing a next character on a next line.

In this way, if an assumed character has a size of 10 cm, a time period to be preset will be about 1 second, which is longer than a time period for drawing one stroke and lasts until the drawing of a next stroke. As a result, during a time period from the start of drawing one character to the end of the same drawing, a changeover between the second scanning mode and the third scanning mode will be repeated, thereby making it possible to perform a position detection within a relatively short scanning period, thus preventing a detection miss at the start of drawing one stroke. Moreover, since the above time period is set to be longer than a time period lasting from the end of drawing one character to the start of drawing a next character, a changeover between the second scanning mode and the third scanning mode can also be repeated when one line of characters are being drawn, thus preventing a detection miss at the start of drawing one character.

Then, when the drawing of one line is finished and the shading object is moved to a next line, since the movement of the shading object at this time is large, the third scanning mode is stopped and the operation is changed over to the first scanning mode which performs an overall scanning, thereby making it possible to exactly detect the start position of drawing after a line feed.

Figure 5:
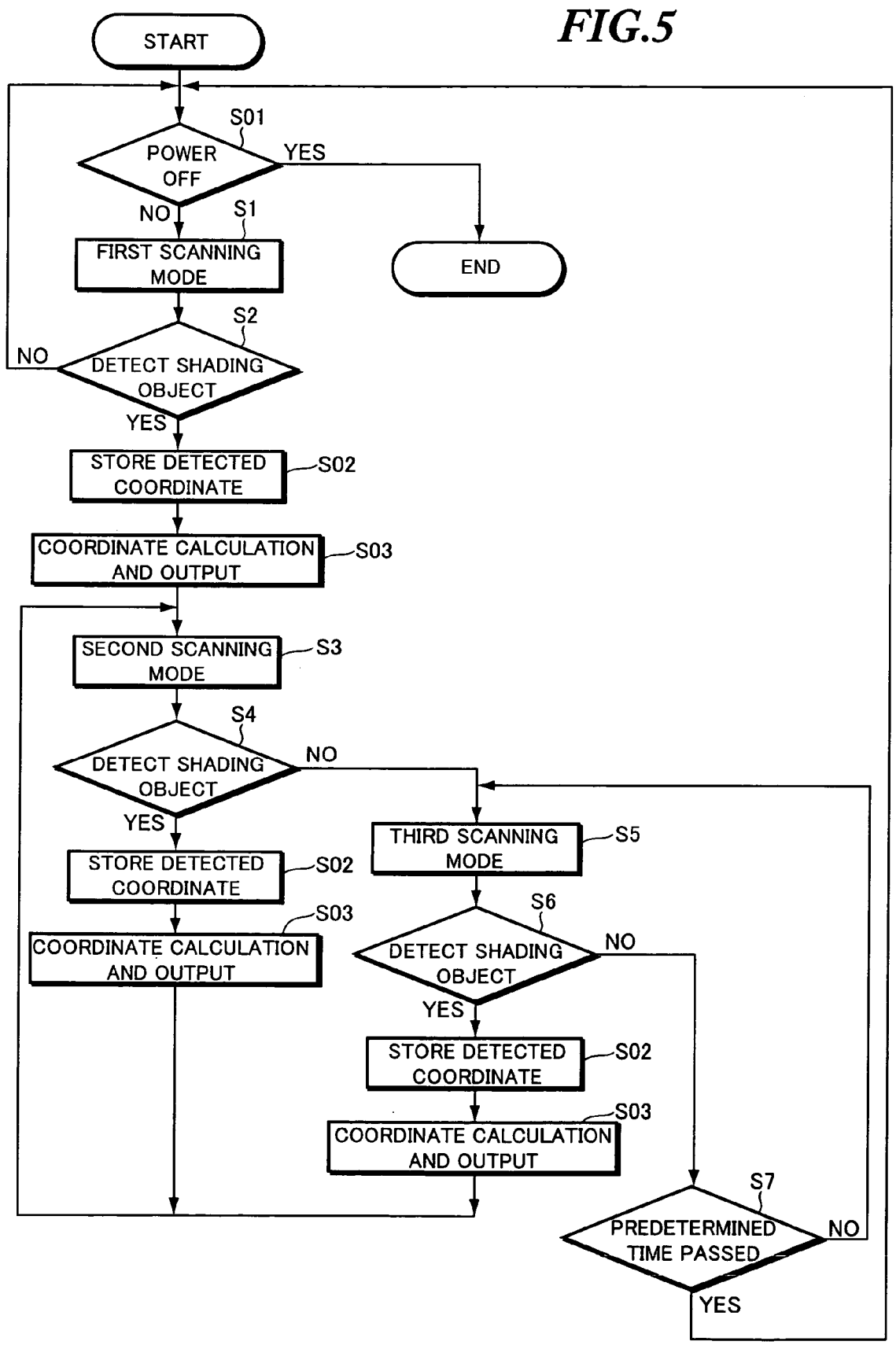
FIG. 5 is a flow chart showing an operation of an entire coordinate position detecting apparatus formed according to an embodiment of the present invention.

FIG. 5 is a flow chart showing an operation of an entire coordinate position detecting apparatus according to the above embodiment of the present invention. However, the same steps as those shown in FIG. 3 will be represented by the same reference numerals and the same description will be partially omitted.

At first, once the coordinate position detecting apparatus is electrically turned on (S01), the first scanning mode is started (S1). Then, once an initial detection of the shading object is effected, an output from the coordinate detecting unit 21 is converted in the data conversion unit 22 so that coordinate data is outputted from the control section 20 and stored in the memory (store coordinate data: S02). Further, an output coordinate with respect to the display surface 10 is calculated in accordance with the coordinate data and displayed on the display surface 10 (coordinate calculation and output: S03).

On the other hand, the drive order control unit 23 performs a changeover in scanning mode in accordance with an output from the coordinate detecting unit 21, so that the operation proceeds to the second scanning mode (S3). The second scanning mode is performed continuously, provided that the detection is still being carried out, and detected coordinate is stored in a manner as described above (store detected coordinate: S02). Meanwhile, coordinate calculation with respect to the display surface 10 is performed (coordinate calculation and output: S03).

Here, if the detection is interrupted, the drive order control unit 23 will change the current scanning mode to the third scanning mode in accordance with an output from the coordinate detecting unit 21 (S5). In the third scanning mode, the scanning within the preset third scanning area is carried out only within a predetermined time period. If the shading object is detected during this time period, the detected coordinate will be stored in a manner as described above (store detected coordinate: S02), while coordinate calculation will be performed with the respect to the display surface 10 and the result thereof will be outputted (coordinate calculation and output: S03). On the other hand, if the shading object fails to be detected during this time period, the operation will return back to the first scanning mode (S1) after the passing of a predetermined time. At this time, if the electric power is turned off, the operation will thus be terminated.

As described above, according to the method of and the apparatus for detecting coordinate position, even if a drawing process frequently involves detection interruptions on the display surface 10, it is still possible to perform a coordinate position detection not involving detection miss. Particularly, when characters are drawn on the display surface 10, it is possible to avoid a detection miss at the start of drawing when shifting from one character to another or from one stroke to another within one character. Moreover, even if drawing is performed at a high speed and the second scanning mode fails to follow the speed, the operation will not proceed to an overall scanning (first scanning mode) but will proceed to the third scanning mode having a short scanning period soon (after a detection interruption has occurred during the second scanning mode) Therefore, it is possible to perform a quick position detection soon after the detection interruption. Besides, although the above description was made based on an example of drawing characters, the present invention should not be limited by this. Actually, the present invention can also be applied in drawing figures or pictures containing dashed lines, thereby obtaining the same effect of preventing a detection miss at the start of drawing after a detection interruption.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A method of detecting a coordinate position which uses respective detection beams to scan in predetermined scanning areas along the horizontal direction and the vertical direction on a display surface, to detect the position of a shading object on the display surface corresponding to the scanning positions of detection beams shaded by the shading object, said method comprising:
   performing a scanning in a first scanning area corresponding to the width of the display surface at the time of an initial detection of the shading object;
   performing, when continuing the detection of the shading object, a scanning in a second scanning area whose scanning region is an area near the latest detection position; and
   performing, after an interruption in the detection of the shading object, a scanning in a third scanning area which is broader than the second scanning area but narrower than the first scanning area, within a predetermined time period and with the detection position of a continued detection serving as a reference.

2. The method according to claim 1, wherein the third scanning area is set based on the size of an assumed character to be drawn on the display surface.

3. The method according to claim 1 or 2, wherein the third scanning area is variable after being set.

4. The method according to claim 1 or 2, wherein the third scanning area is changed automatically in response to an actual use of a user.

5. The method according to claim 1 or 2, wherein the third scanning area is set with a finally detected position of a continued detection serving as a reference.

6. The method according to claim 1 or 2, wherein said predetermined time period is set longer than a time period lasting from the end of drawing one character to the start of drawing an adjacent character when drawing characters on the display surface, but shorter than a time period lasting from the end of drawing one character to the start of drawing a next character on a next line.

7. An apparatus of detecting a coordinate position, equipped with scanning device enabling respective detection beams to scan in predetermined scanning areas along the horizontal direction and the vertical direction on a display surface, to detect the position of a shading object on the display surface corresponding to the scanning positions of the detection beams shaded by the shading object, wherein said scanning device has a first scanning mode, a second scanning mode, and a third scanning mode, the first scanning mode performs a scanning in a scanning area corresponding to the width of the display surface at the time of an initial detection of the shading object;

the second scanning mode performs, when continuing the detection of the shading object, a scanning in a scanning area whose scanning region is near the latest detection position; and the third scanning mode performs, after an interruption in the detection of the shading object, a scanning in a scanning area which is broader than the second scanning area but narrower than the first scanning area, within a predetermined time period and with the detection position of a continued detection serving as a reference.

8. The method according to claim 3, wherein said predetermined time period is set longer than a time period lasting from the end of drawing one character to the start of drawing an adjacent character when drawing characters on the display surface, but shorter than a time period lasting from the end of drawing one character to the start of drawing a next character on a next line.

9. The method according to claim 4, wherein said predetermined time period is set longer than a time period lasting from the end of drawing one character to the start of drawing an adjacent character when drawing characters on the display surface, but shorter than a time period lasting from the end of drawing one character to the start of drawing a next character on a next line.

10. The method according to claim 5, wherein said predetermined time period is set longer than a time period lasting from the end of drawing one character to the start of drawing an adjacent character when drawing characters on the display surface, but shorter than a time period lasting from the end of drawing one character to the start of drawing a next character on a next line.

* * * * *